US012755436B2

(12) United States Patent
Wang et al.

(10) Patent No.: US 12,755,436 B2
(45) Date of Patent: Oct. 6, 2026

(54) POINT CLOUD ATTRIBUTE PREDICTION METHOD AND APPARATUS, TERMINAL, AND STORAGE MEDIUM

(71) Applicant: PENG CHENG LABORATORY, Shenzhen (CN)

(72) Inventors: Jing Wang, Shenzhen (CN); Qi Zhang, Shenzhen (CN); Yueru Chen, Shenzhen (CN); Ge Li, Shenzhen (CN); Wen Gao, Shenzhen (CN)

(73) Assignee: PENG CHENG LABORATORY, Shenzhen (CN)

( * ) Notice: Subject to any disclaimer, the term of this patent is extended or adjusted under 35 U.S.C. 154(b) by 328 days.

(21) Appl. No.: 18/563,146

(22) PCT Filed: Jun. 10, 2022

(86) PCT No.: PCT/CN2022/098242
§ 371 (c)(1),
(2) Date: Nov. 21, 2023

(87) PCT Pub. No.: WO2022/258061
PCT Pub. Date: Dec. 15, 2022

(65) Prior Publication Data

US 2024/0233195 A1 Jul. 11, 2024

(30) Foreign Application Priority Data

Jun. 11, 2021 (CN) ........................ 202110657405.2

(51) Int. Cl.
*G06T 9/00* (2006.01)

(52) U.S. Cl.
CPC .................................. *G06T 9/001* (2013.01)

(58) Field of Classification Search
CPC ..... G06T 9/001; G06T 17/00; G06F 16/2458; G06F 16/2465; H04N 19/593
See application file for complete search history.

(56) References Cited

U.S. PATENT DOCUMENTS

2017/0214943 A1* 7/2017 Cohen .................. H04N 19/625
2020/0304865 A1 9/2020 Yea et al.
(Continued)

FOREIGN PATENT DOCUMENTS

CN 110418135 A * 11/2019 ............. H04N 19/13
CN 110572655 A 12/2019
(Continued)

*Primary Examiner* — Andrew M Moyer
(74) *Attorney, Agent, or Firm* — The Webb Law Firm

(57) ABSTRACT

A point cloud attribute prediction method and apparatus, a terminal and a storage medium are disclosed. The method includes obtaining target neighbor points corresponding to a target point by a first spatial distance, and determining an optimization weight corresponding to each target neighbor point respectively based on a second spatial distance, and finally determining an attribute prediction value corresponding to the target point based on each target neighbor point and optimization weight corresponding to each target neighbor point respectively. The present disclosure optimizes the weight corresponding to each target neighbor point respectively based on the spatial distance, which can improve the correlation between the geometry information and the attribute information of the point cloud, provide more accurate prediction values when performing point cloud attribute prediction, and thus improve the encoding and decoding performance of the point cloud attributes.

14 Claims, 7 Drawing Sheets

(56) References Cited

U.S. PATENT DOCUMENTS

| | | | | |
|---|---|---|---|---|
| 2020/0311984 | A1 | 10/2020 | Yea et al. | |
| 2021/0319581 | A1* | 10/2021 | Hur | H04N 19/70 |
| 2023/0196625 | A1* | 6/2023 | Li | G06T 9/004 382/232 |

FOREIGN PATENT DOCUMENTS

| | | | |
|---|---|---|---|
| CN | 111095929 | A | 5/2020 |
| WO | 2021023206 | A1 | 2/2021 |

* cited by examiner

| | | | | | | |
|---|---|---|---|---|---|---|
| 6 | 5 | 4 | 3 | 4 | 5 | 6 |
| 5 | 4 | 3 | 2 | 3 | 4 | 5 |
| 4 | 3 | 2 | 1 | 2 | 3 | 4 |
| 3 | 2 | 1 | 0 | 1 | 2 | 3 |
| 4 | 3 | 2 | 1 | 2 | 3 | 4 |
| 5 | 4 | 3 | 2 | 3 | 4 | 5 |
| 6 | 5 | 4 | 3 | 4 | 5 | 6 |

(a)

| | | | | | | |
|---|---|---|---|---|---|---|
| 18 | 13 | 10 | 9 | 10 | 13 | 18 |
| 13 | 8 | 5 | 4 | 5 | 8 | 13 |
| 10 | 5 | 2 | 1 | 2 | 5 | 10 |
| 9 | 4 | 1 | 0 | 1 | 4 | 9 |
| 10 | 5 | 2 | 1 | 2 | 5 | 10 |
| 13 | 8 | 5 | 4 | 5 | 8 | 13 |
| 18 | 13 | 10 | 9 | 10 | 13 | 18 |

(b)

| | | | | | | |
|---|---|---|---|---|---|---|
| 3 | 3 | 3 | 3 | 3 | 3 | 3 |
| 3 | 2 | 2 | 2 | 2 | 2 | 3 |
| 3 | 2 | 1 | 1 | 1 | 2 | 3 |
| 3 | 2 | 1 | 0 | 1 | 2 | 3 |
| 3 | 2 | 1 | 1 | 1 | 2 | 3 |
| 3 | 2 | 2 | 2 | 2 | 2 | 3 |
| 3 | 3 | 3 | 3 | 3 | 3 | 3 |

(c)

POINT CLOUD ATTRIBUTE PREDICTION METHOD AND APPARATUS, TERMINAL, AND STORAGE MEDIUM

CROSS-REFERENCE TO RELATED APPLICATIONS

This application is the United States national phase of International Patent Application No. PCT/CN2022/098242 filed Jun. 10, 2022, and which claims priority to Chinese Patent Application No. 202110657405.2 filed Jun. 11, 2021, the disclosures of which are hereby incorporated by reference in their entireties.

BACKGROUND

1. Technical Field

The present disclosure relates to the technical field of point cloud processing, and in particular relates to a point cloud attribute prediction method and apparatus, a terminal and a storage medium.

2. Technical Considerations 3D point cloud is an important representation of real world digitization. With the rapid development of 3D scanning equipment (e.g., laser, radar, etc.), the accuracy and resolution of point clouds have become higher. High-precision point clouds are widely used in the construction of digital maps of cities and play a technical support role in many popular researches, such as smart cities, unmanned vehicles, and cultural relics protection. The point cloud is obtained by 3D scanning equipment sampling the surface of an object, and the number of points in a frame of point cloud is generally in the million level, in which each point contains geometric information and attribute information such as color, reflectance, etc., and the data volume is very huge. The huge data volume of 3D point cloud brings great challenges to data storage and transmission, so it is very important to compress the point cloud.

Point cloud compression is mainly divided into geometry compression and attribute compression. The current point cloud attribute compression method described in the test platform PCRM provided by China's AVS (Audio Video coding Standard) point cloud compression working group mainly adopts the point cloud prediction method based on the 3D spatial order, i.e., the current point cloud is spatially ordered according to the location information of the point cloud, the 3 points with the smallest Manhattan distance from the current point are selected as the neighbors of the current point according to the spatial order, the inverse of the Manhattan distance between each neighbor and the current point is used as the weight of the neighbor, and the weighted average of the attribute reconstruction values of the 3 neighbors is used as the attribute prediction value of the current point. Finally, the actual attribute value of the current point is subtracted from the attribute prediction value to obtain the attribute residual value coded into the bit stream. However, based on the inverse of the Manhattan distance as the weight of the neighbor, the attribute value of the current point is not well predicted, so the accuracy of point cloud attribute prediction is not high.

Therefore, the existing technology still needs improvement and development.

SUMMARY

The technical problem to be solved by the present disclosure is to provide a point cloud attribute prediction method and apparatus, a terminal and a storage medium in response to the above defects of the prior art, aiming at solving the problem of inaccuracy in the prior art of predicting a point cloud attribute based on the inverse of the Manhattan distance as the weight of the neighbor, which leads to inaccuracy in the prediction of the point cloud attribute.

The technical solutions used in the present disclosure to solve the problem are as follows:

In a first aspect, embodiments of the present disclosure provide a point cloud attribute prediction method, wherein the method comprises:

- obtaining several target neighbor points by selecting points in a point cloud based on first spatial distances between the points in the point cloud and a target point;
- determining optimization weights of the target neighbor points based on second spatial distances between the target neighbor points and the target point;
- determining an attribute prediction value of the target point based on the target neighbor points and the optimization weights of the target neighbor points.

In one embodiment, the first spatial distances are determined by:

- calculating a weighted sum of P-powers of magnitudes of differences between two points in N coordinate components;
- or, calculating a maximum value of weighted values of the magnitudes of the differences between two points in the N coordinate components.

In one embodiment, the second spatial distances are determined by:

- calculating a weighted sum of P-powers of magnitudes of differences between two points in N coordinate components;
- or, calculating a maximum value of weighted values of the magnitudes of the differences between two points in the N coordinate components.

In one embodiment, the obtaining several target neighbor points by selecting points in a point cloud based on first spatial distances between the points in the point cloud and a target point, comprises:

- obtaining the several target neighbor points by selecting a preset number of points from the points in the point cloud in an ascending order of the first spatial distances;
- or, obtaining the several target neighbor points by obtaining a preset distance threshold, and selecting points with the first spatial distance less than or equal to the preset distance threshold;
- or, obtaining the several target neighbor points by selecting a preset number of points from the points in the point cloud in the ascending order of the first spatial distances, and selecting points with the first spatial distance being identical to the first spatial distance of one of the preset number of points.

In one embodiment, the determining optimization weights of the target neighbor points based on second spatial distances between the target neighbor points and the target point, comprises:

- determining the optimization weights of the target neighbor points based on the second spatial distances and number of target neighbor points with the same second spatial distance;
- and/or, determining the optimization weights of the target neighbor points based on the second spatial distances and an attribute quantization step size;

and/or, determining the optimization weights of the target neighbor points based on exponential powers of the second spatial distances;

and/or, determining the optimization weights of the target neighbor points based on the second spatial distances and direction vectors of the target neighbor points.

In one embodiment, the determining the optimization weights of the target neighbor points based on the second spatial distances and number of target neighbor points with the same second spatial distance, comprises:

determining optimization distances of the target neighbor points as products of the second spatial distances and the number of target neighbor points with the same second spatial distance; determining the optimization weights of the target neighbor points as inverses of the optimization distances of the target neighbor points;

or, when the number of target neighbor points with the same second spatial distance is greater than 1, determining optimization distances of the target neighbor points as quotients obtained by dividing products of the second spatial distances and the number of target neighbor points with the same second spatial distance by an attribute quantization step size; determining the optimization weights of the target neighbor points as inverses of the optimization distances of the target neighbor points;

or, determining optimization coefficients as a minimum value of the number of target neighbor points with the same second spatial distance and an attribute quantization step size; determining optimization distances of the target neighbor points as quotients obtained by dividing products of the second spatial distances and the number of target neighbor points with the same second spatial distance by the optimization coefficients; determining the optimization weights of the target neighbor points as inverses of the optimization distances of the target neighbor points.

In one embodiment, the determining the optimization weights of the target neighbor points based on the second spatial distances and an attribute quantization step size, comprises:

determining optimization distances of the target neighbor points as sums of the second spatial distances and the attribute quantization step size; determining the optimization weights of the target neighbor points as inverses of the optimization distances of the target neighbor points;

or, determining optimization distances of the target neighbor points as products of the second spatial distances and sums of the second spatial distances and the attribute quantization step size; determining the optimization weights of the target neighbor points as inverses of the optimization distances of the target neighbor points.

In one embodiment, the determining the optimization weights of the target neighbor points based on exponential powers of the second spatial distances, comprises:

determining optimization distances of the target neighbor points as exponential powers of the second spatial distances; determining the optimization weights of the target neighbor points as inverses of the optimization distances of the target neighbor points;

or, determining optimization distances of the target neighbor points as values of exponential power polynomial of the second spatial distances; determining the optimization weights of the target neighbor points as inverses of the optimization distances of the target neighbor points.

In one embodiment, the determining the optimization weights of the target neighbor points based on the second spatial distances and direction vectors of the target neighbor points, comprises:

obtaining direction vectors of the target neighbor points;

determining whether parallel neighbor points exist according to the direction vectors of the target neighbor points, wherein the direction vectors of the parallel neighbor points are parallel;

if the parallel neighbor points exist, determining the optimization weight of the parallel neighbor point with larger second spatial distance as 0;

determining the optimization weights as inverses of the second spatial distances of the parallel neighbor point with the smallest second spatial distance and the target neighbor points other than the parallel neighbor points.

In one embodiment, the determining the optimization weights of the target neighbor points based on the second spatial distances and direction vectors of the target neighbor points, comprises:

obtaining direction vectors of the target neighbor points;

determining an axial normalized direction vector corresponding to each of the target neighbor points based on the direction vectors of the target neighbor points;

determining whether co directional neighbor points exist based on the axial normalized direction vectors of the target neighbor points, wherein the axial normalized direction vectors of the co directional neighbor points are the same;

if the co directional neighbor points exist, determining the optimization weight of the co directional neighbor point with larger second spatial distance as 0;

determining the optimization weights as inverses of the second spatial distances of the co directional neighbor point with the smallest second spatial distance and the target neighbor points other than the co directional neighbor points.

In one embodiment, the determining an attribute prediction value of the target point based on the target neighbor points and the optimization weights of the target neighbor points, comprises:

obtaining reconstruction attribute values of the target neighbor points;

determining a weighted average based on the optimization weights of the target neighbor points and the reconstruction attribute values of the target neighbor points, determining an attribute prediction value as the weighted average.

In one embodiment, the method further comprises:

obtaining an attribute value of the target point, determining an attribute residual value of the target point as a difference between the attribute value and the attribute prediction value of the target point;

obtaining a point cloud bit stream by encoding the attribute residual value.

In one embodiment, the method further comprises:

obtaining an attribute residual reconstruction value of the target point by decoding a point cloud bit stream;

determining an attribute reconstruction value of the target point based on a sum of the attribute prediction value and the attribute residual reconstruction value.

In a second aspect, embodiments of the present disclosure provide a point cloud attribute prediction apparatus, wherein the apparatus comprises:

a neighbor points selection module, for obtaining several target neighbor points by selecting points in a point cloud based on first spatial distances between the points in the point cloud and a target point;

a weight determination module, for determining optimization weights of the target neighbor points based on second spatial distances between the target neighbor points and the target point;

an attribute prediction module, for determining an attribute prediction value of the target point based on the target neighbor points and the optimization weights of the target neighbor points.

In a third aspect, embodiments of the present disclosure provide a terminal, wherein the terminal comprises a memory and one or more processors; the memory stores one or more programs; the programs comprise instructions for executing the point cloud attribute prediction method as described in any one of the above embodiments; the processors are used to execute the programs.

In a fourth aspect, embodiments of the present disclosure provide a computer-readable storage medium, storing a plurality of instructions, wherein the instructions are loaded and executed by a processor to implement the point cloud attribute prediction method as described in any one of the above embodiments.

Beneficial effect of the present disclosure: in the embodiments of the present disclosure, target neighbor points corresponding to a target point are selected by a first spatial distance, and an optimization weight corresponding to each target neighbor point is determined respectively based on a second spatial distance, and finally an attribute prediction value corresponding to the target point is determined based on each target neighbor point and optimization weight corresponding to each target neighbor point respectively. The present disclosure optimizes the weight corresponding to each target neighbor point respectively based on the spatial distance, which can improve the correlation between the geometry information and the attribute information of the point cloud, provide more accurate prediction values when performing point cloud attribute prediction, and thus improve the encoding and decoding performance of the point cloud attributes.

BRIEF DESCRIPTION OF THE DRAWINGS

In order to more clearly illustrate the technical solutions in the embodiments of the present disclosure or prior art, the following will briefly introduce the accompanying drawings that need to be used in the description of the embodiments or prior art, and it is obvious that the accompanying drawings in the following description are only some of the embodiments documented in the present disclosure, and other accompanying drawings may be obtained based on these drawings for those of ordinary skill in the art, without creative labor.

FIG. 2*a* is a schematic diagram of spatial distance at P=1 in a two-dimensional space provided by a non-limiting embodiment of the present disclosure;

FIG. 2*b* is a schematic diagram of spatial distance at P=2 in a two-dimensional space provided by a non-limiting embodiment of the present disclosure;

FIG. 2*c* is a schematic diagram of another spatial distance at P=1 in a two-dimensional space provided by a non-limiting embodiment of the present disclosure;

DETAILED DESCRIPTION

Figures 1, 2:
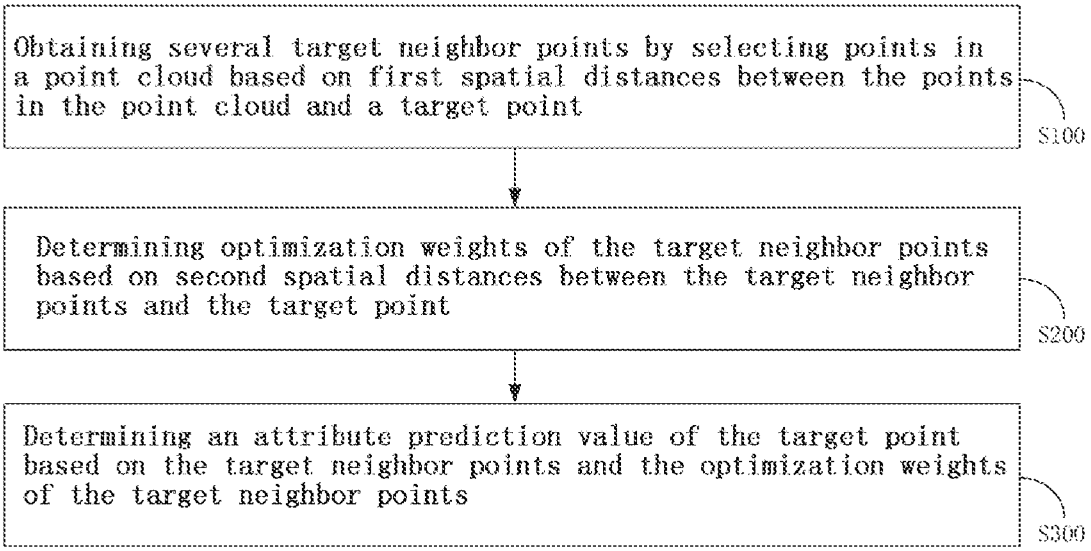
FIG. 1 is a flow diagram of a point cloud attribute prediction method provided by a non-limiting embodiment of the present disclosure.

In order to make the objects, technical solutions and advantages of the present disclosure clearer and more explicit, the present disclosure is described in further detail hereinafter with reference to the accompanying drawings and by way of embodiments. It should be understood that the specific embodiments described herein are only for explaining the present disclosure and are not intended to limit the present disclosure.

It is to be noted that if there are embodiments of the present disclosure involving directional indications (such as up, down, left, right, forward, back . . . ), such directional indications are only used to explain the relative positional relationship, movement and the like between the various components in a particular attitude (as shown in the accompanying drawings), and if such particular attitude is changed, the directional indications are also changed accordingly.

3D point cloud is an important representation of real world digitization. With the rapid development of 3D scanning equipment (e.g., laser, radar, etc.), the accuracy and resolution of point clouds have become higher. High-precision point clouds are widely used in the construction of digital maps of cities and play a technical support role in many popular researches, such as smart cities, unmanned vehicles, and cultural relics protection. The point cloud is obtained by 3D scanning equipment sampling the surface of an object, and the number of points in a frame of point cloud is generally in the million level, in which each point contains geometric information and attribute information such as color, reflectivity, etc., and the data volume is very huge. The huge data volume of 3D point cloud brings great challenges to data storage and transmission, so it is very important to compress the point cloud.

Point cloud compression is mainly divided into geometry compression and attribute compression. The current point cloud attribute compression method described in the test platform PCRM provided by China's AVS (Audio Video coding Standard) point cloud compression working group mainly adopts the point cloud prediction method based on the 3D spatial order, i.e., selecting out a fixed number of neighbor points with the nearest Manhattan distance to the target point as the target neighbor points, the inverse of the Manhattan distance between each of the target neighbor points and the target point is used as the weight of the target neighbor point, and the weighted average of the attribute reconstruction values of the target neighbor points is used as the attribute prediction value of the target point. Finally, the actual attribute value of the current point is subtracted from the attribute prediction value to obtain the attribute residual value coded into the bit stream. However, based on the inverse of the Manhattan distance as the weight of the target neighbor point does not accurately reflect the correlation of geometry information and attribute information of the point cloud, so the accuracy of point cloud attribute prediction is not high.

Aiming at the aforesaid defects of the prior art, the present disclosure provides a point cloud attribute prediction method, including: obtaining several target neighbor points by selecting points in a point cloud based on first spatial distances between the points in the point cloud and a target point; determining optimization weights of the target neighbor points based on second spatial distances between the target neighbor points and the target point; determining an attribute prediction value of the target point based on the target neighbor points and the optimization weights of the target neighbor points. As the present disclosure optimizes the weights corresponding to each of the target neighbor points based on the spatial distances, the correlation of geometry information and attribute information of the point cloud can be improved to provide more accurate prediction values when performing point cloud attribute prediction, thereby improving the encoding and decoding performance of the point cloud attributes.

As shown in FIG. 1, the method comprises the following step:

Step S100, obtaining several target neighbor points by selecting points in a point cloud based on first spatial distances between the points in the point cloud and a target point.

Specifically, since the points in the point cloud include all points adjacent to the target point, there may exist points that are farther away from the target point, and the correlation between the attribute values of these points that are farther away from the target point and the target point is usually small, the present embodiment needs to select the points in the point cloud based on a first spatial distance between two points that are closer to the target point as target neighbor points for calculating an attribute prediction value of the target point.

In one embodiment, both the first spatial distance and the second spatial distance may for example be determined using method 1 or method 2:

Method 1: determining the first spatial distance or the second spatial distance by calculating a weighted sum of P-powers of magnitudes of differences between two points in N coordinate components;

Method 2: determining the first spatial distance or the second spatial distance by calculating a maximum value of weighted values of the magnitudes of the differences between two points in the N coordinate components.

Specifically, in the first method provided in this embodiment, determination is made based on an exponential power weighted sum of the magnitude of the difference between two points in a number of coordinate components. For example, if the coordinates of two points in a three-dimensional space are (x1, y1, z1), (x2, y2, z2), the difference between these two points in the three coordinate components of X-axis, Y-axis and Z-axis, respectively, needs to be calculated to obtain three differences, and the P-power-weighted sum of the magnitudes of the three differences is taken as the first spatial distance/second spatial distance between these two points. As shown below, the first spatial distance/second spatial distance d between the two points may be expressed as:

$$d = cx|x2 - x1|^P + cy|y2 - y1|^P + cz|z2 - z1|^P$$

where cx, cy, cz are the weights of X-axis, Y-axis, and Z-axis, respectively. cx, cy, cz, P are positive numbers. When cx, cy, cz are all 1, then the first spatial distance/second spatial distance d between two points may be expressed as:

$$d = |x2 - x1|^P + |y2 - y1|^P + |z2 - z1|^P$$

where P is a positive number. FIG. 2*a* shows a schematic diagram of the first spatial distance/second spatial distance at P=1 in two dimensions. FIG. 2*b* shows a schematic diagram of the first spatial distance/second spatial distance at P=2 in two dimensions.

The second method requires calculating the difference between two points in a number of coordinate components, and calculating the exponential power of the magnitude of each difference, and using the maximum of a number of weighted values calculated to determine the first spatial distance/second spatial distance between the two points. For example, if the coordinates of two points in a three-dimensional space are (x1, y1, z1), (x2, y2, z2), the difference between these two points in the three coordinate components of X-axis, Y-axis and Z-axis, respectively, needs to be calculated to obtain three differences, the respective P-power of the magnitude of these three differences are calculated and multiplied by their respective weight values, and the maximum of these three weighted values is used as the first spatial distance/second spatial distance between these two points. As shown below, the first spatial distance/second spatial distance d between the two points may be expressed as:

$$d = \max(cx|x2 - x1|^P, cy|y2 - y1|^P, cz|z2 - z1|^P$$

where cx, cy, cz are the weights of X-axis, Y-axis, and Z-axis, respectively. cx, cy, cz, P are positive numbers. FIG. 2*c* shows a schematic diagram of the first spatial distance/second spatial distance in two dimensions when cx, cy, cz, P are all 1.

In one embodiment, the obtaining several target neighbor points by selecting points in a point cloud based on first spatial distances between the points in the point cloud and a target point, specifically includes: obtaining the several target neighbor points by selecting a preset number of points from the points in the point cloud in an ascending order of the first spatial distances.

Specifically, in this embodiment, points that are farther away from the target point according to the first spatial distance are screened out and points that are closer to the target point are retained. For example, assume that there are five points a, b, c, d, and e around the target point A. The first spatial distance between a and A is d1, the first spatial distance between b and A is d2, the first spatial distance between c and A is d3, the first spatial distance between d and A is d4, and the first spatial distance between e and A is d5, and $d1<d2<d3<d4<d5$. Sorting and selecting are performed based on a preset number of points. If the preset number is 3, the selecting process may be as follows: among the distances d1, d2, d3, and d4 of the 4 points of a, b, c, and d, 3 smallest distances are selected as d1, d2, and d3 in ascending order of distance, followed by selecting 3 smallest distances among d1, d2, d3 and the first spatial distance d5 between e and A, arranged in ascending order of distance: d1, d2, d3, then a, b, and c are elected. If the preset number is 2, then the selecting process may be: among the distances d1, d2, and d3 of the 3 points of a, b, and c. 2 smallest distances are selected as d1 and d2 in ascending order of distance, followed by selecting 2 smallest distances among d1, d2, and d4 as d1 and d2 in ascending order of distance, followed by selecting 2 smallest distances among d1, d2, and d5 as d1 and d2 in ascending order of distance, then a and b are selected. Alternatively, sorting and selecting may be performed based on all points, the selecting process may be: according to the first spatial distance in an ascending order, the sorting is a, b, c, d, e. If selecting 2 target neighbor points, then a and b are selected; if selecting 3 target neighbor points, then a, b and c are selected.

In another embodiment, the obtaining several target neighbor points by selecting points in a point cloud based on first spatial distances between the points in the point cloud and a target point, specifically includes: obtaining the several target neighbor points by obtaining a preset distance threshold, and selecting points with the first spatial distance less than or equal to the preset distance threshold.

Specifically, since the correlation of the attribute values between the target point and the points closer to the target point may be higher, in order to select all the points that are closer to the target point, in this embodiment, a distance threshold is preset, and the points with a first spatial distance that is less than or equal to the preset distance threshold are determined to be closer to the target point and are used as the target neighbor points.

For example, assume that there are five points a, b, c, d, and e around the target point A. The first spatial distance between a and A is 1, the first spatial distance between b and A is 1, the first spatial distance between c and A is 2, the first spatial distance between d and A is 4, and the first spatial distance between e and A is 5, and the preset distance threshold is 3. The points with first spatial distances less than or equal to 3 are a, b, and c. Therefore, a, b, and c are target neighbor points.

In another embodiment, the obtaining several target neighbor points by selecting points in a point cloud based on first spatial distances between the points in the point cloud and a target point, specifically includes: obtaining the several target neighbor points by selecting a preset number of points from the points in the point cloud in an ascending order of the first spatial distances, and selecting points with the first spatial distance being identical to the first spatial distance of one of the preset number of points.

For example, assume that there are five points a, b, c, d, and e around the target point A. The first spatial distance between a and A is 1, the first spatial distance between b and A is 1, the first spatial distance between c and A is 2, the first spatial distance between d and A is 5, and the first spatial distance between e and A is 2, and the preset number is 3. The distances of the three points with the smallest first spatial distance are 1, 1, 2, and the corresponding points are a, b, c, and c. Therefore, a, b, c, and e are target neighbor points.

As shown in FIG. 1, the method further comprises the following step:

Step S200, determining optimization weights of the target neighbor points based on second spatial distances between the target neighbor points and the target point.

In order to accurately predict the attribute value of the target point, in this embodiment, an optimization weight for each target neighbor point around the target point is determined based on the second spatial distance, and the magnitude of the optimization weight may reflect the importance of the target neighbor point in the subsequent calculation of the attribute prediction value of the target point.

Specifically, in this embodiment, method 1 or method 2 may be used to determine the second spatial distance between the target neighbor point and the target point. It is to be understood that if the same method is used to calculate the first spatial distance and the second spatial distance, they are equal; if different methods are used to calculate the first spatial distance and the second spatial distance, they are not equal. That is, the first spatial distance and the second spatial distance used in this embodiment may or may not be equal.

Figure 3:
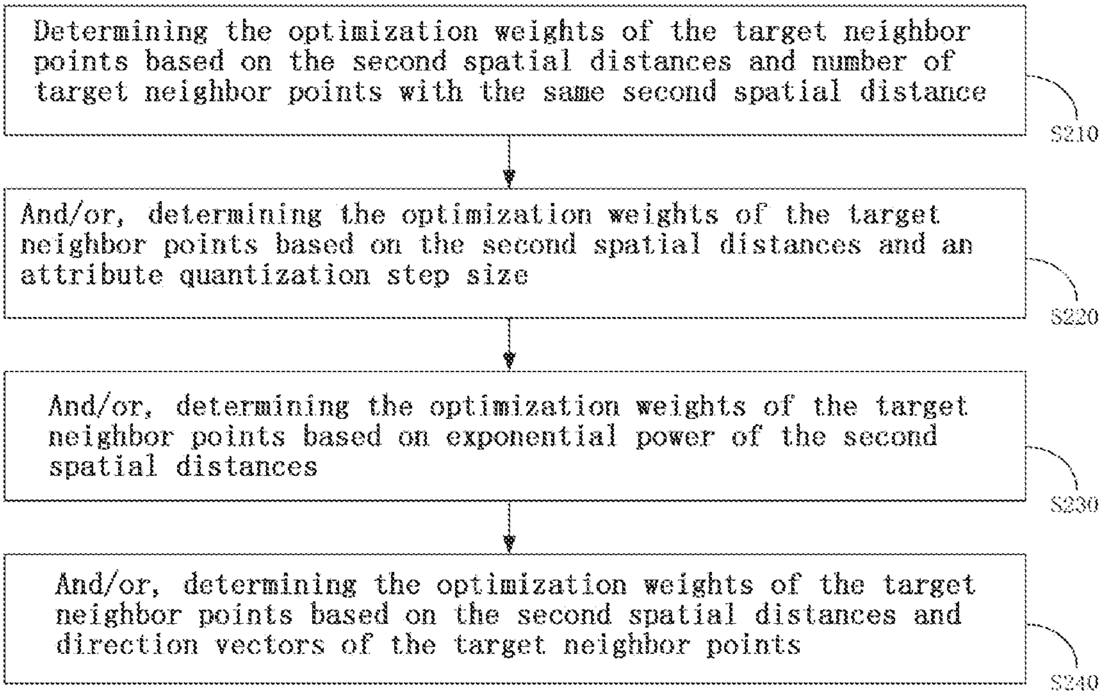
FIG. 3 is another flow diagram of a point cloud attribute prediction method provided by non-limiting embodiments of the present disclosure.

As shown in FIG. 3, in one implementation, the determining optimization weights of the target neighbor points based on second spatial distances between the target neighbor points and the target point, specifically includes: S210, determining the optimization weights of the target neighbor points based on the second spatial distances and number of target neighbor points with the same second spatial distance.

Figure 4:
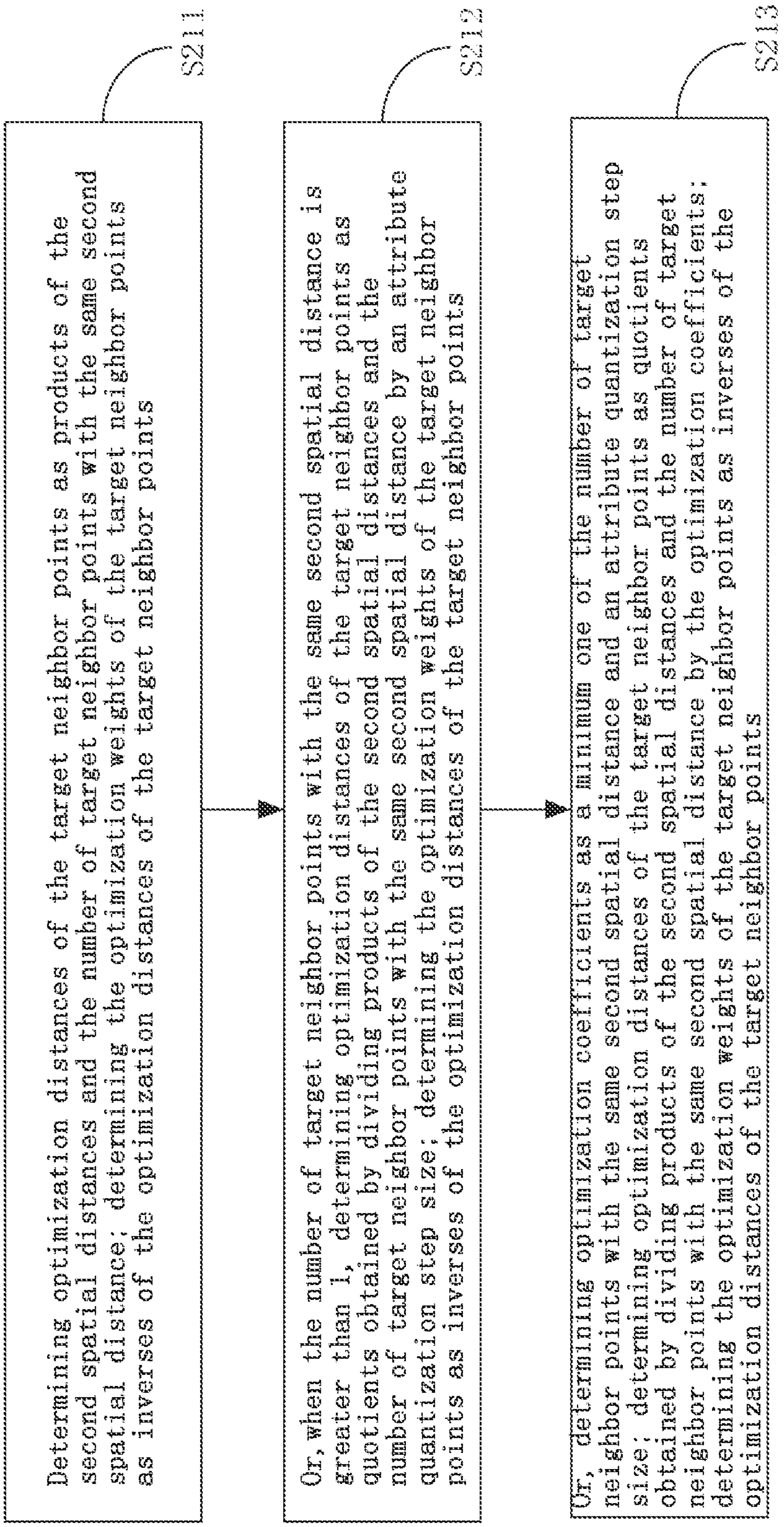
FIG. 4 is a further flow diagram of a point cloud attribute prediction method provided by non-limiting embodiments of the present disclosure.

As shown in FIG. 4, in one implementation, the determining the optimization weights of the target neighbor points based on the second spatial distances and number of target neighbor points with the same second spatial distance, specifically includes: S211, determining optimization distances of the target neighbor points as products of the second spatial distances and the number of target neighbor points with the same second spatial distance; determining the optimization weights of the target neighbor points as inverses of the optimization distances of the target neighbor points.

For example, assume that there are five target neighbor points a, b, c, d, and e around the target point A, and the corresponding second spatial distances are 1, 2, 3, 3, 3, the number of target neighbor points with second spatial distance of 1 is 1, the number of target neighbor points with second spatial distance of 2 is 1, and the number of target neighbor points with second spatial distance of 3 is 3, the optimization distances of the five target neighbor points are respectively 1, 2, $3\times3$, $3\times3$, $3\times3$, and the corresponding optimization weights are 1, $\frac{1}{2}$, $\frac{1}{9}$, $\frac{1}{9}$, and $\frac{1}{9}$, respectively. The point cloud prediction accuracy is improved due to the consideration of the imbalance of the number of points at different distances.

As shown in FIG. 4, in one implementation, the determining the optimization weights of the target neighbor points based on the second spatial distances and number of target neighbor points with the same second spatial distance, specifically includes: S212, when the number of target neighbor points with the same second spatial distance is greater than 1, determining optimization distances of the target neighbor points as quotients obtained by dividing products of the second spatial distances and the number of target neighbor points with the same second spatial distance by an attribute quantization step size; determining the optimization weights of the target neighbor points as inverses of the optimization distances of the target neighbor points.

For example, assume that there are five target neighbor points a, b, c, d, and e around the target point A, and the corresponding second spatial distances are 1, 2, 3, 3, 3, and the attribute quantization step size is 2. The number of target neighbor points with second spatial distance of 1 is 1, the number of target neighbor points with second spatial distance of 2 is 1, the number of target neighbor points with second spatial distance of 3 is 3, and the five target neighbor points with optimization distances are 1, 2, 3×3/2, 3×3/2, 3×3/2, and the corresponding optimization weights are 1, $\frac{1}{2}$, $\frac{2}{9}$, $\frac{2}{9}$, and $\frac{2}{9}$, respectively. The point cloud prediction accuracy is improved due to the consideration of the factor of quantization error of the reconstruction attribute values of the target neighbor points caused by different quantization step size.

As shown in FIG. 4, in one implementation, the determining the optimization weights of the target neighbor points based on the second spatial distances and number of target neighbor points with the same second spatial distance, specifically includes: S213, determining optimization coefficients as a minimum value of the number of target neighbor points with the same second spatial distance and an attribute quantization step size; determining optimization distances of the target neighbor points as quotients obtained by dividing products of the second spatial distances and the number of target neighbor points with the same second spatial distance by the optimization coefficients; determining the optimization weights of the target neighbor points as inverses of the optimization distances of the target neighbor points.

For example, assume that there are five target neighbor points a, b, c, d, and e around the target point A, and the corresponding second spatial distances are 1, 2, 3, 3, 3. The number of target neighbor points with second spatial distance of 1 is 1, the number of target neighbor points with second spatial distance of 2 is 1, the number of target neighbor points with second spatial distance of 3 is 3. If the attribute quantization step size is 1, then the optimization coefficients for the 5 target neighbor points are 1, 1, 1, 1, and 1 respectively, the optimization distances of the 5 target neighbor points are 1, 2, 3×3, 3×3, and 3×3 respectively, the corresponding optimization weights are 1, $\frac{1}{2}$, $\frac{1}{9}$, $\frac{1}{9}$, and $\frac{1}{9}$, respectively. If the attribute quantization step size is 2, the optimization coefficients of the 5 target neighborhood points are 1, 1, 2, 2, and 2, respectively. The optimization distances of the 5 target neighborhood points are 1, 2, 3×3/2, 3×3/2, 3×3/2, and 3×3/2, respectively, and the corresponding optimization weights are 1, $\frac{1}{2}$, $\frac{2}{9}$, $\frac{2}{9}$, $\frac{2}{9}$. If the attribute quantization step size is 4, the optimization coefficients of the 5 target neighbor points are 1, 1, 3, 3, 3, 3, and the optimization distances of the 5 target neighbor points are 1, 2, 3×3/3, 3×3/3, 3×3/3, respectively, and the corresponding optimization weights are 1, $\frac{1}{2}$, $\frac{1}{3}$, $\frac{1}{3}$, $\frac{1}{3}$, $\frac{1}{3}$, respectively. The point cloud prediction accuracy is improved due to considering the balance of the number of points with different spatial distances and the quantization error factors caused by different quantization step size simultaneously.

As shown in FIG. 3, in one embodiment, the determining optimization weights of the target neighbor points based on second spatial distances between the target neighbor points and the target point, specifically includes: S220, determining the optimization weights of the target neighbor points based on the second spatial distances and an attribute quantization step size.

Figure 5:
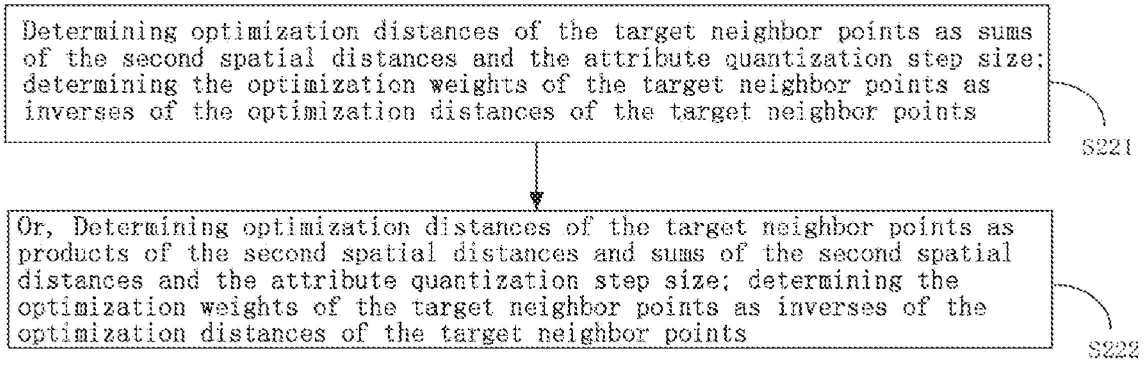
FIG. 5 is a further flow diagram of a point cloud attribute prediction method provided by non-limiting embodiments of the present disclosure.

As shown in FIG. 5, in one embodiment, the determining the optimization weights of the target neighbor points based on the second spatial distances and an attribute quantization step size, specifically includes: S221, determining optimization distances of the target neighbor points as sums of the second spatial distances and the attribute quantization step size; determining the optimization weights of the target neighbor points as inverses of the optimization distances of the target neighbor points.

For example, assume that there are five target neighbor points a, b, c, d, and e around the target point A, and the corresponding second spatial distances are 1, 2, 3, 3, 3, and the attribute quantization step size is 2. The optimization distances of the five target neighbor points are 1+2, 2+2, 3+2, 3+2, and 3+2. The corresponding optimization weights are $\frac{1}{3}$, $\frac{1}{4}$, $\frac{1}{5}$, $\frac{1}{5}$, and $\frac{1}{5}$, respectively. The point cloud prediction accuracy is improved due to the consideration of the factor of quantization error of the reconstruction attribute values of the target neighbor points caused by different quantization step size.

As shown in FIG. 5, in one embodiment, the determining the optimization weights of the target neighbor points based on the second spatial distances and an attribute quantization step size, specifically includes: S222, determining optimization distances of the target neighbor points as products of the second spatial distances and sums of the second spatial distances and the attribute quantization step size; determining the optimization weights of the target neighbor points as inverses of the optimization distances of the target neighbor points.

For example, assume that there are five target neighbor points a, b, c, d, and e around the target point A, and the corresponding second spatial distances are 1, 2, 3, 3, 3, and the attribute quantization step size is 2. The optimization distances of the five target neighbor points are (1+2)×1. (2+2)×2. (3+2)×3, (3+2)×3, and (3+2)×3. The corresponding optimization weights are respectively $\frac{1}{3}$, $\frac{1}{8}$, $\frac{1}{15}$, $\frac{1}{15}$, and $\frac{1}{15}$. The point cloud prediction accuracy is improved due to the consideration of the spatial distance and the quantization error factor caused by different quantization step size simultaneously.

As shown in FIG. 3, in one embodiment, the determining optimization weights of the target neighbor points based on second spatial distances between the target neighbor points and the target point, specifically includes: S230, determining the optimization weights of the target neighbor points based on exponential power of the second spatial distances.

Figure 6:
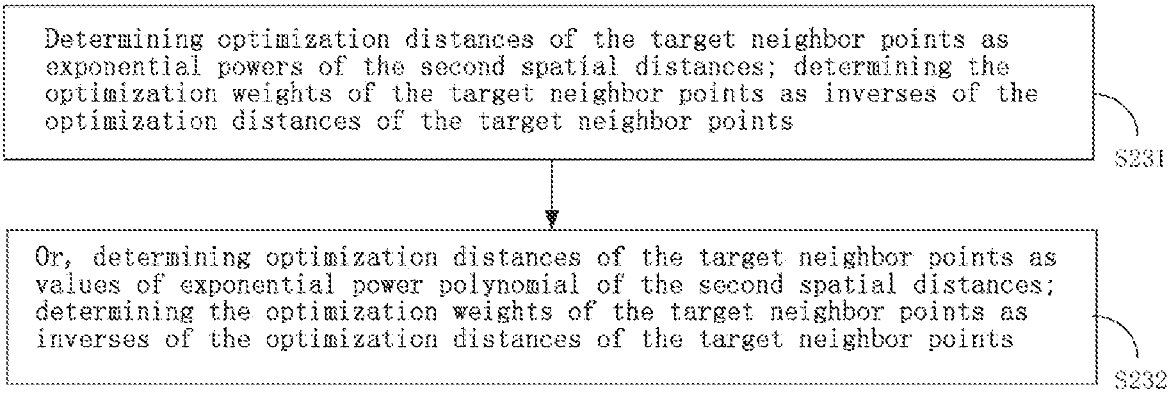
FIG. 6 is a further flow diagram of a point cloud attribute prediction method provided by non-limiting embodiments of the present disclosure.

As shown in FIG. 6, in one embodiment, the determining the optimization weights of the target neighbor points based on exponential power of the second spatial distances, specifically includes: S231, determining optimization distances of the target neighbor points as exponential powers of the second spatial distances; determining the optimization weights of the target neighbor points as inverses of the optimization distances of the target neighbor points. For example, assume that the second spatial distance of the target neighbor point a is d2, the optimization distance of the target neighbor point a is (d2), the optimization weight w may be expressed as $w=1/(d2)^{\varrho}$.

As shown in FIG. 6, in another embodiment, the determining the optimization weights of the target neighbor points based on exponential power of the second spatial distances, specifically includes: S232, determining optimization distances of the target neighbor points as values of exponential power polynomial of the second spatial distances; determining the optimization weights of the target neighbor points as inverses of the optimization distances of the target neighbor points. For example, assume that the second spatial distance of the target neighbor point a is d2, if the exponential power polynomial is a quadratic polynomial, the optimization distance of the target neighbor point a is $(d2)^2+a(d2)+b$, the optimization weight w may be expressed as $w=1/((d2)^2+a(d2)+b)$.

As shown in FIG. 3, in one embodiment, the determining optimization weights of the target neighbor points based on second spatial distances between the target neighbor points and the target point, specifically includes: S240, determining the optimization weights of the target neighbor points based on the second spatial distances and direction vectors of the target neighbor points.

Figure 7:
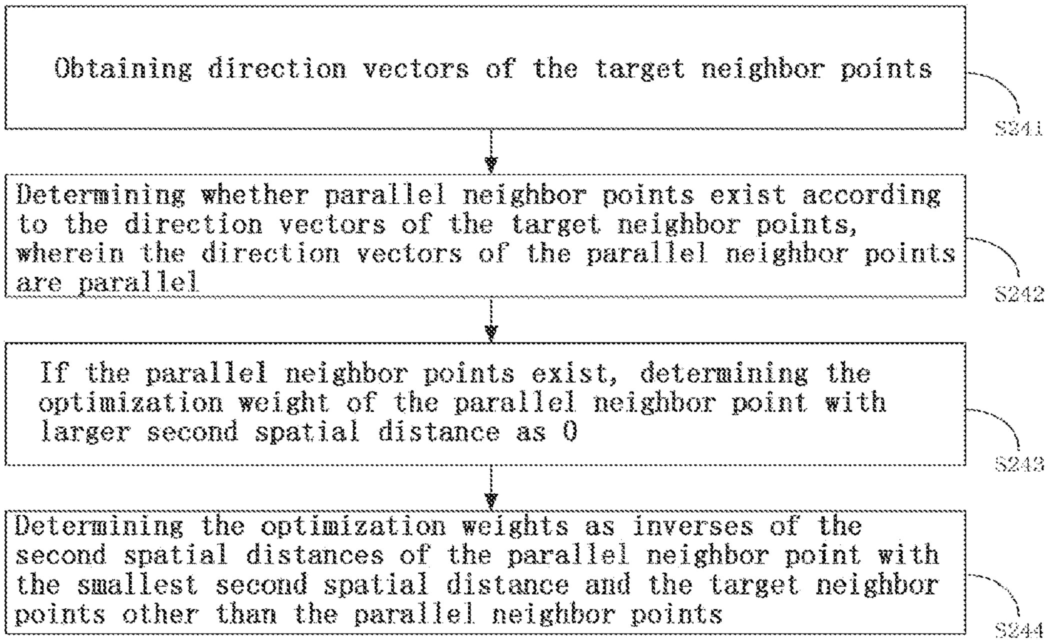
FIG. 7 is a further flow diagram of a point cloud attribute prediction method provided by non-limiting embodiments of the present disclosure.

As shown in FIG. 7, in one embodiment, the determining the optimization weights of the target neighbor points based on the second spatial distances and direction vectors of the target neighbor points, specifically includes: S241, obtaining direction vectors of the target neighbor points; S242, determining whether parallel neighbor points exist according to the direction vectors of the target neighbor points, wherein the direction vectors of the parallel neighbor points are parallel; S243, if the parallel neighbor points exist, determining the optimization weight of the parallel neighbor point with larger second spatial distance as 0; S244, determining the optimization weights as inverses of the second spatial distances of the parallel neighbor point with the smallest second spatial distance and the target neighbor points other than the parallel neighbor points.

For example, in three-dimensional space, the coordinates of the target point A are v0=(1, 2, 2), and there are four target neighbor points, a, b, c, and d. The second spatial distances are 1, 1, 2, and 2, and the coordinates are v1=(0, 2, 2), v2=(1, 1, 2), v3=(1, 1, 1), and v4=(1, 0, 2), and the direction vectors are v0-v1=(1, 0, 0), v0-v2=(0, 1, 0), v0-v3=(0, 1, 1), v0-v4=(0, 2, 0). Since the direction vector (0, 2, 0) of the target neighbor point d is parallel to the direction vector (0, 1, 0) of the target neighbor point b, and the second spatial distance of the target neighbor point d is larger than that of the target neighbor point b, then the optimization weight of the target neighbor point d is set to 0, i.e., it does not participate in the calculation of the weighted average, and the optimization weights of the target neighbor points a, b, and c are 1, 1, and ½.

Figure 8:
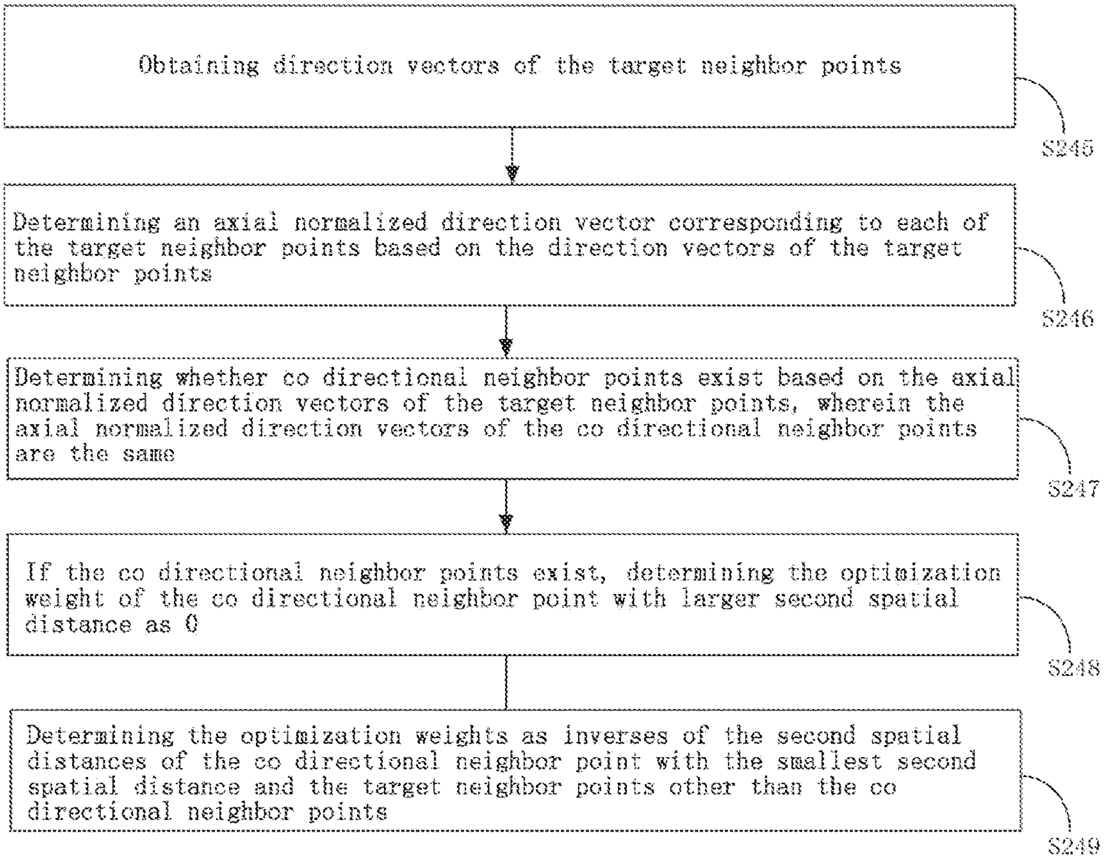
FIG. 8 is a further flow diagram of a point cloud attribute prediction method provided by non-limiting embodiments of the present disclosure.

As shown in FIG. 8, in another embodiment, the determining the optimization weights of the target neighbor points based on the second spatial distances and direction vectors of the target neighbor points, specifically includes: S245, obtaining direction vectors of the target neighbor points; S246, determining an axial normalized direction vector corresponding to each of the target neighbor points based on the direction vectors of the target neighbor points; S247, determining whether co directional neighbor points exist based on the axial normalized direction vectors of the target neighbor points, wherein the axial normalized direction vectors of the co directional neighbor points are the same; S248, if the co directional neighbor points exist, determining the optimization weight of the co directional neighbor point with larger second spatial distance as 0; S249, determining the optimization weights as inverses of the second spatial distances of the co directional neighbor point with the smallest second spatial distance and the target neighbor points other than the co directional neighbor points.

Specifically, the axial normalized direction vector may better reflect the balance of the direction distribution of the target neighbor points, such as in FIG. 2*c*, the axial normalized direction vector of the target neighbor points in two-dimensional space is represented by 8 points with a distance of 1. Even though the direction vectors of a point with a distance of 2 or 3 is not parallel to the direction vector of a point with a distance of 1, the axial normalized direction vector is the same, the optimization weights of the points with a distance of 2 or 3 are set to 0, i.e., they do not participate in the calculation of the weighted average. Therefore, in this embodiment, the axial normalized direction vector is used to optimize the weights of the target neighbor points, which can more accurately predict the attribute of the target point.

For example, in three-dimensional space, the coordinates of the target point A are v0=(1, 2, 2), and there are four target neighbor points, a, b, c, and d. The second spatial distances are 1, 1, 2, and 2, and the coordinates are v1=(0, 2, 2), v2=(1, 1, 1), v3=(0, 1, 1), and v4=(1, 1, 0), and the direction vectors are v0-v1=(1, 0, 0), v0-v2=(0, 1, 1), v0-v3=(1, 1, 1), v0-v4=(0, 1, 2), and the axial normalized direction vectors map the values on each coordinate component into the range of −1 to 1. The values greater than 1 are set to 1, and the values less than −1 are set to −1, keeping the values −1, 0, 1 unchanged. Thus the direction vectors of the target neighbor points a, b, and c are already axial normalized direction vectors, and the axial normalized direction vector of the target neighbor point d is (0, 1, 1). Since the axial normalized direction vectors of the target neighbor point d and b are the same, and the second spatial distance of 2 of the target neighbor point d is greater than the second spatial distance of 1 of the target neighbor point b, the optimization weight of the target neighbor point d is set to 0, i.e., it does not participate in the calculation of the weighted average, and the optimization weights of target neighbor points a, b, and c are 1, 1, and ½.

As shown in FIG. 1, the method further comprises the following step.

Step S300, determining an attribute prediction value of the target point based on the target neighbor points and the optimization weights of the target neighbor points.

Specifically, in this embodiment, a prediction attribute value of the target point is determined based on each target neighbor point and corresponding optimization weight. The optimization weight corresponding to each target neighbor point may reflect the importance of the target neighbor point in calculating the prediction attribute value of the target point. Target neighbor points with lower weight values have lower contributions in calculating the prediction attribute value of the target point, while target neighbor points with higher weight values have higher contributions in calculating the prediction attribute value of the target point.

Figure 9:
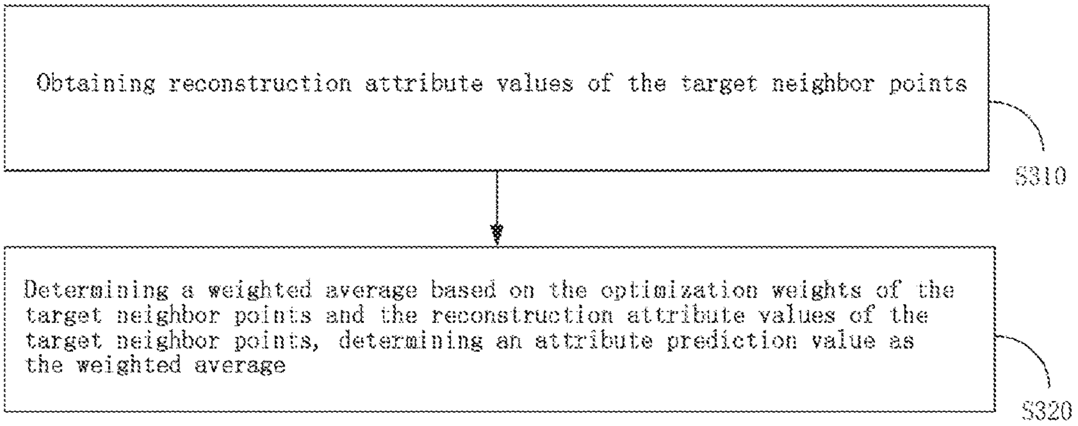
FIG. 9 is a further flow diagram of a point cloud attribute prediction method provided by non-limiting embodiments of the present disclosure.

In one embodiment, the step S300 specifically comprises the following steps, as shown in FIG. 9:

Step S310, obtaining reconstruction attribute values of the target neighbor points;

Step S320, determining a weighted average based on the optimization weights of the target neighbor points and the reconstruction attribute values of the target neighbor points, determining an attribute prediction value as the weighted average.

Specifically, in order to calculate the prediction attribute value of the target point, the present embodiment needs to obtain the reconstruction attribute value of each target neighbor point, and then multiply the reconstruction attribute value of each target neighbor point with corresponding optimization weight one-by-one to obtain the weighted attribute value corresponding to each target neighbor point respectively, and then divide the sum of the weighted attribute values of all the target neighbor points by the sum of the optimization weights of all the target neighbor points to obtain a weighted average value, which is taken as the attribute prediction value of the target point.

Figure 10:
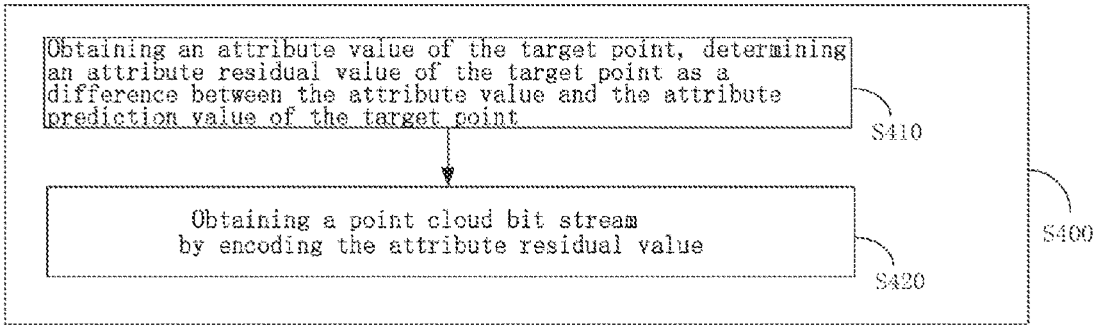
FIG. 10 is a further flow diagram of a point cloud attribute prediction method provided by non-limiting embodiments of the present disclosure.

As shown in FIG. 10, in one implementation, the method further comprises an attribute encoding method S400, with the specific steps as follows:

Step S410, obtaining an attribute value of the target point, determining an attribute residual value of the target point as a difference between the attribute value and the attribute prediction value of the target point;

Step S420, obtaining a point cloud bit stream by encoding the attribute residual value.

Specifically, the present embodiment may determine an attribute residual value of the target point based on the difference between the attribute value and the attribute prediction value of the target point. The attribute residual value may reflect the error between the actual attribute value and the prediction attribute value, and then be encoded (e.g., transformation, quantization, entropy encoding, etc.) to obtain a point cloud bit stream.

Figure 11:
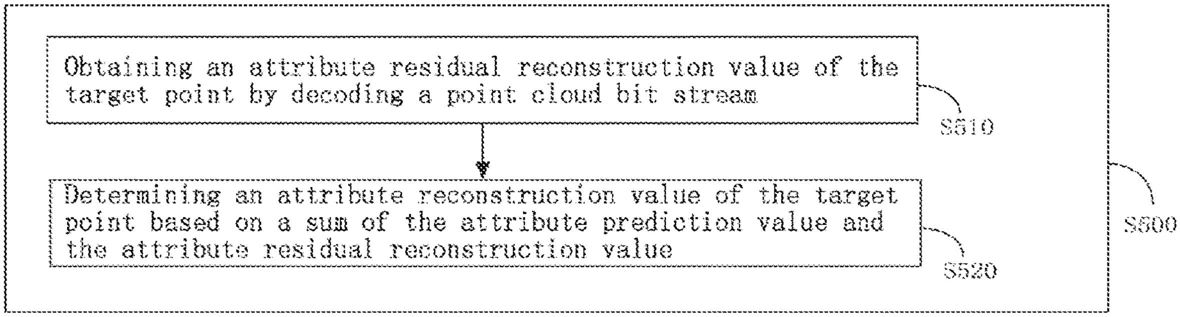
FIG. 11 is a further flow diagram of a point cloud attribute prediction method provided by non-limiting embodiments of the present disclosure.

As shown in FIG. 11, in one implementation, the method further comprises an attribute decoding method S500, with the specific steps as follows:

Step S510, obtaining an attribute residual reconstruction value of the target point by decoding a point cloud bit stream;

Step S520, determining an attribute reconstruction value of the target point based on the sum of the attribute prediction value and the attribute residual reconstruction value.

Specifically, the present embodiment decodes the point cloud bit stream (e.g., entropy decoding, inverse quantization, inverse transformation, etc.) to obtain the attribute residual reconstruction value of the target point, and then adds the attribute prediction value with the attribute residual reconstruction value of the target point to obtain the attribute reconstruction value of the target point.

To illustrate the technical effect of the present disclosure, the inventors compare the results obtained by point cloud compression using the method of the present disclosure with the results of the test platform PCRM 3.0, as shown in Tables 1-3.

TABLE 1

Performance results for limited lossy geometry lossy attribute condition

| Limited lossy geometry lossy attribute | End-to-end attribute rate distortion (intra-frame) Luma | Chroma Cb | Chroma Cr |
|---|---|---|---|
| Category 1B data sets | −2.5% | −7.3% | −9.6% |
| Category 3 data sets | −5.2% | −5.1% | −3.2% |

TABLE 2

Performance results for lossless geometry lossy attribute condition

| Lossless geometry lossy attribute | End-to-end attribute rate distortion (intra-frame) Luma | Chroma Cb | Chroma Cr |
|---|---|---|---|
| Category 1B data sets | −3.5% | −3.3% | −6.0% |
| Category 3 data sets | −10.0% | −6.7% | −6.7% |

TABLE 3

Performance results for lossless geometry limited lossy attribute condition

| Lossless geometry limited lossy attributes | End-to-end attribute rate distortion (intra-frame) Luma | Chroma Cb | Chroma Cr |
|---|---|---|---|
| Category 1B data sets | −1.5% | −1.5% | −1.5% |
| Category 3 data sets | −5.1% | −5.1% | −5.1% |

As can be seen from the data in Tables 1-3, compared to the results of the test platform PCRM 3.0, for the color attributes including Luma, Chroma Cb, and Chroma Cr, the method provided by the present disclosure has performance improvement in all conditions, with Luma having a performance improvement of 5.3%, 10.0%, and 5.1%, respectively, Chroma Cb having a performance improvement of 5.1%, 6.7%, and 5.1%, respectively, and Chroma Cr having performance improvement of 3.2%, 6.7% and 5.1% respectively.

Figure 12:
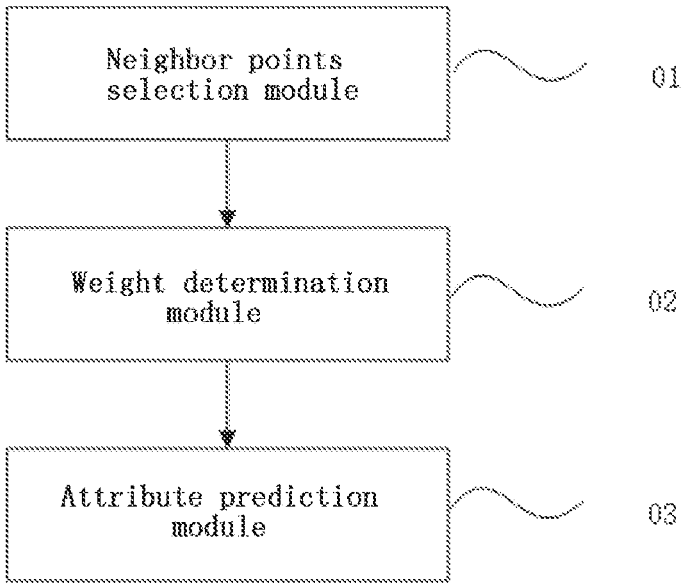
FIG. 12 is a schematic diagram showing connections of internal modules of a point cloud attribute prediction apparatus provided by a non-limiting embodiment of the present disclosure.

Based on the above embodiments, the present disclosure also provides a point cloud attribute prediction apparatus, as shown in FIG. 12, which comprises:

a neighbor points selection module 01, for obtaining several target neighbor points by selecting points in a point cloud based on first spatial distances between the points in the point cloud and a target point;

a weight determination module 02, for determining optimization weights of the target neighbor points based on second spatial distances between the target neighbor points and the target point;

an attribute prediction module 03, for determining an attribute prediction value of the target point based on the target neighbor points and the optimization weights of the target neighbor points.

Figure 13:
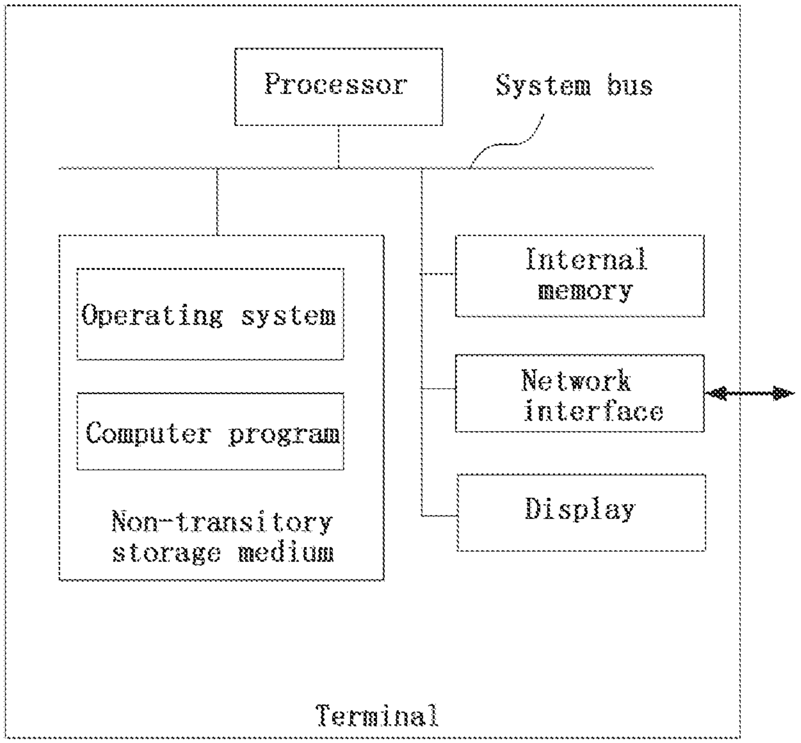
FIG. 13 is a schematic diagram of a terminal provided by a non-limiting embodiment of the present disclosure.

Based on the above embodiments, the present disclosure also provides a terminal, the schematic diagram may be shown in FIG. 13. The terminal includes a processor, a memory, a network interface, and a display connected via a system bus, wherein the processor of the terminal is used to provide computing and control capabilities. The memory of the terminal includes a non-transitory storage medium and an internal memory. The non-transitory storage medium stores an operating system and a computer program. The internal memory provides an environment for the operation of the operating system and the computer program in the non-transitory storage medium. The network interface of the terminal is used for communicating with an external terminal via a network connection. The computer program is executed by a processor to implement the point cloud attribute prediction method. The display of the terminal may be a liquid crystal display or an electronic ink display.

Those of ordinary skills in the art can understand that the schematic diagram shown in FIG. 13 is only a block diagram of some structures related to the embodiment of the present disclosure and does not constitute a limitation on the terminal to which the embodiment of the present disclosure is applied, and the specific terminal may comprise more or fewer components than those shown in the figure, or combine certain components, or have different component arrangements.

In one implementation, one or more programs are stored in the memory of the terminal and are configured to be executed by one or more processors. The one or more programs comprise instructions for performing the point cloud attribute prediction method.

Those of ordinary skills in the art may understand that realizing all or part of the processes in the above embodiments may be completed by instructing the relevant hardware through a computer program. The computer program may be stored in a non-transitory computer readable storage medium, and when executed, may comprise processes in the embodiments of the above methods, wherein any reference to a memory, storage, database, or other medium used in the various embodiments provided by the present disclosure may include non-transitory and/or transitory memory. The non-transitory memory may include read-only memory (ROM), programmable ROM (PROM), electrically programmable ROM (EPROM), electrically erasable programmable ROM (EEPROM), or flash memory. The transitory memory may include random access memory (RAM) or external cache memory. By way of illustration and not limitation, RAM is available in various forms, such as static RAM (SRAM), dynamic RAM (DRAM), synchronous DRAM (SDRAM), dual data rate SDRAM (DDRSDRAM), enhanced SDRAM (ESDRAM), synchronous link DRAM (SLDRAM), memory bus (Rambus) direct RAM (RDRAM), direct memory bus dynamic RAM (DRDRAM), and memory bus dynamic RAM (RDRAM), etc.

As used herein, the term "terminal" may refer to a computing device including one or more electronic devices configured to process data and/or a server including one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., terminals, servers, mobile devices, etc.) directly or indirectly communicating in the network environment may constitute a system. Further, reference to "a terminal" or "a processor," as used herein, may refer to a previously-recited terminal and/or processor that is recited as performing a previous step or function, a different terminal and/or processor, and/or a combination of terminals and/or processors. For example, as used in the specification and the claims, a first terminal and/or a first processor that is recited as performing a first step or function may refer to the same or different terminal and/or a processor recited as performing a second step or function. In non-limiting embodiments, the one or more processors may be implemented in hardware, firmware, or a combination of hardware and software.

In summary, the present disclosure discloses a point cloud attribute prediction method, apparatus, terminal and storage medium, by obtaining a target point to be processed in a point cloud, determining points adjacent to the target point and obtaining several initial neighbor points; obtaining a first spatial distance between each of the several initial neighbor points and the target point respectively, and obtaining several target neighbor points by selecting points in the several initial neighbor points based on the first spatial distances; obtaining a second spatial distance between each of the target neighbor points and the target point respectively, determining optimization weights of the target neighbor points based on the second spatial distances; and determining an attribute prediction value of the target point based on the target neighbor points and the optimization weights of the target neighbor points. Since the spatial distance can truly reflect the distance in each component between two points, the target neighbor points selected based on the spatial distance by the present disclosure are more accurate, and the problem of inaccurate neighbor points selected based on the Manhattan distance in the prior art, which leads to the inaccuracy of the point cloud attribute prediction, can be solved.

It should be understood that the application of the present disclosure is not limited to the above examples, and may be improved or transformed in accordance with the above description to those of ordinary skills in the art, all of which improvements and transformations shall fall within the protection scope of the claims of the present disclosure.

What is claimed is:

1. A point cloud attribute prediction method, comprising:

obtaining several target neighbor points by selecting points in a point cloud based on first spatial distances between the points in the point cloud and a target point;

determining optimization weights of the target neighbor points based on second spatial distances between the target neighbor points and the target point; and determining an attribute prediction value of the target point based on the target neighbor points and the optimization weights of the target neighbor points;

wherein determining optimization weights of the target neighbor points based on second spatial distances between the target neighbor points and the target point, comprises at least one of the following:

determining optimization distances of the target neighbor points as products of the second spatial distances and the number of target neighbor points with the same second spatial distance; determining the optimization weights of the target neighbor points as inverses of the optimization distances of the target neighbor points; or when the number of target neighbor points with the same second spatial distance is greater than 1, determining optimization distances of the target neighbor points as quotients obtained by dividing products of the second spatial distances and the number of target neighbor points with the same second spatial distance by an attribute quantization step size; determining the optimization weights of the target neighbor points as inverses of the optimization distances of the target neighbor points; or determining optimization coefficients as a minimum value of the number of target neighbor points with the same second spatial distance and an attribute quantization step size; determining optimization distances of the target neighbor points as quotients obtained by dividing products of the second spatial distances and the number of target neighbor points with the same second spatial distance by the optimization coefficients; determining the optimization weights of the target neighbor points as inverses of the optimization distances of the target neighbor points.

2. The point cloud attribute prediction method of claim 1, wherein the first spatial distances are determined by at least one of:

calculating a weighted sum of P-powers of magnitudes of differences between two points in N coordinate components; or calculating a maximum value of weighted values of the magnitudes of the differences between two points in the N coordinate components.

3. The point cloud attribute prediction method of claim 1, wherein the second spatial distances are determined by at least one of:

calculating a weighted sum of P-powers of magnitudes of differences between two points in N coordinate components; or calculating a maximum value of weighted values of the magnitudes of the differences between two points in the N coordinate components.

4. The point cloud attribute prediction method of claim 1, wherein obtaining several target neighbor points by selecting points in a point cloud based on first spatial distances between the points in the point cloud and a target point, comprises at least one of:

obtaining the several target neighbor points by selecting a preset number of points from the points in the point cloud in an ascending order of the first spatial distances; or obtaining the several target neighbor points by obtaining a preset distance threshold, and selecting points with the first spatial distance less than or equal to the preset distance threshold; or obtaining the several target neighbor points by selecting a preset number of points from the points in the point cloud in the ascending order of the first spatial distances and selecting points with the first spatial distance being identical to the first spatial distance of one of the preset number of points.

5. The point cloud attribute prediction method of claim 1, wherein determining optimization weights of the target neighbor points based on second spatial distances between the target neighbor points and the target point, further comprises at least one of the following:

determining the optimization weights of the target neighbor points based on the second spatial distances and an attribute quantization step size; or determining the optimization weights of the target neighbor points based on exponential powers of the second spatial distances; or determining the optimization weights of the target neighbor points based on the second spatial distances and direction vectors of the target neighbor points;

or any combination thereof.

6. The point cloud attribute prediction method of claim 5, wherein determining the optimization weights of the target neighbor points based on the second spatial distances and an attribute quantization step size, comprises at least one of:

determining optimization distances of the target neighbor points as sums of the second spatial distances and the attribute quantization step size; determining the optimization weights of the target neighbor points as inverses of the optimization distances of the target neighbor points; or determining optimization distances of the target neighbor points as products of the second spatial distances and sums of the second spatial distances and the attribute quantization step size; determining the optimization weights of the target neighbor points as inverses of the optimization distances of the target neighbor points.

7. The point cloud attribute prediction method of claim 5, wherein determining the optimization weights of the target neighbor points based on exponential powers of the second spatial distances, comprises at least one of:

determining optimization distances of the target neighbor points as exponential powers of the second spatial distances; determining the optimization weights of the target neighbor points as inverses of the optimization distances of the target neighbor points; or determining optimization distances of the target neighbor points as values of exponential power polynomial of the second spatial distances; determining the optimization weights of the target neighbor points as inverses of the optimization distances of the target neighbor points.

8. The point cloud attribute prediction method of claim 5, wherein determining the optimization weights of the target neighbor points based on the second spatial distances and direction vectors of the target neighbor points, comprises:

obtaining direction vectors of the target neighbor points;

determining whether parallel neighbor points exist according to the direction vectors of the target neighbor points, wherein the direction vectors of the parallel neighbor points are parallel;

if the parallel neighbor points exist, determining the optimization weight of the parallel neighbor point with larger second spatial distance as 0; and determining the optimization weights as inverses of the second spatial distances of the parallel neighbor point with the smallest second spatial distance and the target neighbor points other than the parallel neighbor points.

9. The point cloud attribute prediction method of claim 5, wherein determining the optimization weights of the target neighbor points based on the second spatial distances and direction vectors of the target neighbor points, comprises:

obtaining direction vectors of the target neighbor points;

determining an axial normalized direction vector corresponding to each of the target neighbor points based on the direction vectors of the target neighbor points;

determining whether co directional neighbor points exist based on the axial normalized direction vectors of the target neighbor points, wherein the axial normalized direction vectors of the co directional neighbor points are the same;

if the co directional neighbor points exist, determining the optimization weight of the co directional neighbor point with larger second spatial distance as 0; and determining the optimization weights as inverses of the second spatial distances of the co directional neighbor point with the smallest second spatial distance and the target neighbor points other than the co directional neighbor points.

10. The point cloud attribute prediction method of claim 1, wherein determining an attribute prediction value of the target point based on the target neighbor points and the optimization weights of the target neighbor points, comprises:

obtaining reconstruction attribute values of the target neighbor points; and determining a weighted average based on the optimization weights of the target neighbor points and the reconstruction attribute values of the target neighbor points, determining an attribute prediction value as the weighted average.

11. The point cloud attribute prediction method of claim 1, wherein the method further comprises an attribute residual encoding method, the attribute residual encoding method comprises:

obtaining an attribute value of the target point, determining an attribute residual value of the target point as a difference between the attribute value and the attribute prediction value of the target point; and obtaining a point cloud bit stream by encoding the attribute residual value.

12. The point cloud attribute prediction method of claim 1, wherein the method further comprises an attribute residual decoding method, the attribute residual decoding method comprises:

obtaining an attribute residual reconstruction value of the target point by decoding a point cloud bit stream; and determining an attribute reconstruction value of the target point based on a sum of the attribute prediction value and the attribute residual reconstruction value.

13. A terminal, wherein the terminal comprises a memory and one or more processors; the memory stores one or more programs, which when executed by the one or more processors, cause the one or more processors to perform a point cloud attribute prediction method, comprising:

obtaining several target neighbor points by selecting points in a point cloud based on first spatial distances between the points in the point cloud and a target point;

determining optimization weights of the target neighbor points based on second spatial distances between the target neighbor points and the target point; and determining an attribute prediction value of the target point based on the target neighbor points and the optimization weights of the target neighbor points;

wherein determining optimization weights of the target neighbor points based on second spatial distances between the target neighbor points and the target point, comprises at least one of the following:

determining optimization distances of the target neighbor points as products of the second spatial distances and the number of target neighbor points with the same second spatial distance; determining the optimization weights of the target neighbor points as inverses of the optimization distances of the target neighbor points; or when the number of target neighbor points with the same second spatial distance is greater than 1, determining optimization distances of the target neighbor points as quotients obtained by dividing products of the second spatial distances and the number of target neighbor points with the same second spatial distance by an attribute quantization step size; determining the optimization weights of the target neighbor points as inverses of the optimization distances of the target neighbor points; or determining optimization coefficients as a minimum value of the number of target neighbor points with the same second spatial distance and an attribute quantization step size; determining optimization distances of the target neighbor points as quotients obtained by dividing products of the second spatial distances and the number of target neighbor points with the same second spatial distance by the optimization coefficients; determining the optimization weights of the target neighbor points as inverses of the optimization distances of the target neighbor points.

14. A non-transitory computer-readable storage medium, storing instructions, which when executed by one or more processors, cause the one or more processors to perform a point cloud attribute prediction method, comprising:

obtaining several target neighbor points by selecting points in a point cloud based on first spatial distances between the points in the point cloud and a target point;

determining optimization weights of the target neighbor points based on second spatial distances between the target neighbor points and the target point; and determining an attribute prediction value of the target point based on the target neighbor points and the optimization weights of the target neighbor points;

wherein determining optimization weights of the target neighbor points based on second spatial distances between the target neighbor points and the target point, comprises at least one of the following:

determining optimization distances of the target neighbor points as products of the second spatial distances and the number of target neighbor points with the same second spatial distance;

determining the optimization weights of the target neighbor points as inverses of the optimization distances of the target neighbor points; or when the number of target neighbor points with the same second spatial distance is greater than 1, determining optimization distances of the target neighbor points as quotients obtained by dividing products of the second spatial distances and the number of target neighbor points with the same second spatial distance by an attribute quantization step size; determining the optimization weights of the target neighbor points as inverses of the optimization distances of the target neighbor points; or determining optimization coefficients as a minimum value of the number of target neighbor points with the same second spatial distance and an attribute quantization step size; determining optimization distances of the target neighbor points as quotients obtained by dividing products of the second spatial distances and the number of target neighbor points with the same second spatial distance by the optimization coefficients; determining the optimization weights of the target neighbor points as inverses of the optimization distances of the target neighbor points.

* * * * *